(12) United States Patent
Carambat (10) Patent No.: US 7,934,963 B1
(45) Date of Patent: May 3, 2011

(54) AMPHIBIOUS VEHICLE

(76) Inventor: David Carambat, Covington, LA (US)

(*) Notice: Subject to any disclaimer, the term of this patent is extended or adjusted under 35 U.S.C. 154(b) by 132 days.

(21) Appl. No.: 12/263,995

(22) Filed: Nov. 3, 2008

Related U.S. Application Data (60) Provisional application No. 60/985,398, filed on Nov. 5, 2007.

(51) Int. Cl.
*B60F 3/00* (2006.01)
*B63H 19/08* (2006.01)

(52) U.S. Cl. .................................... 440/12.51

(58) Field of Classification Search ............... 440/12.5, 440/12.51; 441/35
See application file for complete search history.

(56) References Cited

U.S. PATENT DOCUMENTS

| | | | |
|---|---|---|---|
| 2,350,037 A | 5/1944 | Hofheins et al. | |
| 2,397,791 A | 4/1946 | Kramer at al. | |
| 2,466,236 A | 4/1949 | Hecker | |
| 2,704,989 A | 3/1955 | Konecny | |
| 3,011,184 A * | 12/1961 | Curcio | 441/40 |
| 3,026,841 A | 3/1962 | Pender | |
| D195,832 S | 8/1963 | Bauer | |
| 3,153,396 A | 10/1964 | Pender | |
| 3,199,486 A | 8/1965 | Gillois et al. | |
| D217,056 S | 3/1970 | Gamaunt | |
| 3,765,368 A | 10/1973 | Asbeck | |
| 3,941,074 A | 3/1976 | Millerbernd | |
| 4,269,598 A * | 5/1981 | Labelle | 440/11 |
| 4,958,584 A | 9/1990 | Williamson | |
| 5,199,372 A | 4/1993 | Seligman et al. | |
| 5,410,980 A | 5/1995 | Wardavoir | |
| 5,520,138 A | 5/1996 | Humphrey | |
| 5,562,066 A | 10/1996 | Gere et al. | |
| 5,590,616 A * | 1/1997 | Vera | 114/61.16 |
| 5,752,862 A | 5/1998 | Mobler et al. | |
| 5,769,021 A | 6/1998 | Schad | |
| 5,868,093 A | 2/1999 | Tseng | |
| RE36,901 E | 10/2000 | Roycroft et al. | |
| D447,443 S | 9/2001 | Royle | |
| D449,565 S | 10/2001 | Royle | |
| 6,435,346 B1 * | 8/2002 | Allain et al. | 206/335 |
| 6,482,052 B1 | 11/2002 | Giljam | |
| 6,502,523 B1 | 1/2003 | Robb | |
| 6,575,796 B1 | 6/2003 | McDowell | |
| 6,595,359 B1 * | 7/2003 | Allain et al. | 206/335 |
| 6,672,916 B1 | 1/2004 | Lent-Phillips et al. | |
| 6,764,358 B2 | 7/2004 | Gibbs | |
| 6,855,017 B2 | 2/2005 | Roycroft | |
| 6,881,107 B2 | 4/2005 | Roycroft | |
| 6,886,837 B2 | 5/2005 | Gibbs | |
| 6,910,928 B2 | 6/2005 | Pease | |
| 7,000,978 B1 | 2/2006 | Messano | |
| 7,011,557 B2 | 3/2006 | Gibbs | |
| 7,021,228 B2 | 4/2006 | Robb | |
| 7,089,822 B2 | 8/2006 | Gibbs et al. | |
| 7,207,851 B1 | 4/2007 | Gibbs et al. | |
| 7,214,112 B2 | 5/2007 | Gibbs | |
| 7,234,982 B2 | 6/2007 | Longdill et al. | |
| 2002/0002939 A1 | 1/2002 | Beauchesne et al. | |
| 2003/0153215 A1 | 8/2003 | Gibbs | |
| 2003/0154895 A1 | 8/2003 | Robb | |

* cited by examiner

*Primary Examiner* — Daniel V Venne
(74) *Attorney, Agent, or Firm* — Garvey, Smith, Nehrbass & North, L.L.C.; Seth M. Nehrbass; Charles C. Garvey, Jr.

(57) ABSTRACT

An amphibious craft has a buoyant raft with a self-bailing upper surface. A cabin or upper is mounted to the raft. An engine/motor selectively drives a pair of wheels or a water drive. A disconnect enables only one drive to be engaged with the engine/motor.

15 Claims, 6 Drawing Sheets

AMPHIBIOUS VEHICLE

CROSS-REFERENCE TO RELATED APPLICATIONS

Priority of U.S. Provisional Patent Application Ser. No. 60/985,398, filed Nov. 5, 2007, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to amphibious vehicles. More particularly, the present invention relates to an improved amphibious vehicle having a body with upper and lower sections, the upper section providing a cabin for holding one or more occupants, the lower section being a buoyant raft with an upper surface that is self-bailing, the raft supporting an engine having a transaxle that enables engagement of a wheel drive for travel on land and a water drive for travel on water.

2. General Background of the Invention

Several patents have issued for amphibious vehicles. The following table is a listing of possibly relevant amphibious craft, the order of listing being numerical and otherwise of no significance.

TABLE

| Pat. No. | TITLE | ISSUE DATE |
|---|---|---|
| 2,350,037 | Amphibian Vehicle | May 30, 1944 |
| 2,397,791 | Amphibious Vehicle | Apr. 2, 1946 |
| 2,466,236 | Amphibious Vehicle | Apr. 5, 1949 |
| 2,704,989 | Multiple Purpose Amphibious Military Trailer Vehicle | Mar. 29, 1955 |
| 3,026,841 | Amphibian Vehicle | Mar. 27, 1962 |
| Des 195,832 | Amphibious Armored Vehicle | Aug. 6, 1963 |
| 3,153,396 | Amphibian Vehicle | Oct. 20, 1964 |
| 3,199,486 | Amphibious Vehicle | Aug. 10, 1965 |
| Des 217,056 | Armored Amphibious Combat Vehicle | Mar. 31, 1970 |
| 3,765,368 | Amphibious Vehicle | Oct. 16, 1973 |
| 3,941,074 | Amphibious Bus | Mar. 2, 1976 |
| 4,958,584 | Amphibious Vehicle Having an Efficient Water-Borne Operational Mode | Sep. 25, 1990 |
| 5,199,372 | Amphibious Vehicle | Apr. 6, 1993 |
| 5,410,980 | Amphibious Motor Vehicle Chassis and Vehicle Including Such a Chasis | May 2, 1995 |
| 5,520,138 | Amphibious Boat | May 28, 1996 |
| 5,562,066 | Amphibious Vehicle | Oct. 8, 1996 |
| 5,769,021 | Amphibious Craft | Jun. 23, 1998 |
| 5,752,862 | Power Train Layout for an Amphibious Vehicle | May 19, 1998 |
| 5,868,093 | Amphibious Vehicle | Feb. 9, 1999 |
| Re. 36,901 | Wheel-Retraction Apparatus and Method for Amphibious Vehicle | Oct. 3, 2000 |
| D447,443 | Amphibious Bus | Sep. 4, 2001 |
| D449,565 | Amphibious Vehicle | Oct. 23, 2001 |
| 2002/0002939 | Displacement Hull Amphibious Vehicle Using a Front Wheel Drive System | Jan. 10, 2002 |
| 6,482,052 | Amphibious Vehicle | Nov. 19, 2002 |
| 6,502,523 | Road-Towed Heavy Ferry | Jan. 7, 2003 |
| 6,575,796 | Amphibious Vehicle Drive Train | Jun. 10, 2003 |
| 2003/0153215 | Power Train | Aug. 14, 2003 |
| 2003/0154895 | Road Towed Ferry | Aug. 21, 2003 |
| 6,672,916 | Amphibious Vehicle | Jan. 6, 2004 |
| 6,764,358 | Amphibious Vehicle | Jul. 20, 2004 |
| 6,855,017 | Power Train | Feb. 15, 2005 |
| 6,881,107 | Amphibious Vehicle Comprising an Improved Decoupler | Apr. 19, 2005 |
| 6,886,837 | Hydraulic Suspension Strut for an Amphibious Vehicle | May 3, 2005 |
| 6,910,928 | Amphibious Vehicle with Spray Control Means | Jun. 28, 2005 |
| 7,000,978 | Thin-Skin Ultralight Recreational Vehicle Body System | Feb. 21, 2006 |
| 7,011,557 | Amphibious Vehicle | Mar. 14, 2006 |
| 7,021,228 | Road Towed Ferry | Apr. 4, 2006 |
| 7,089,822 | Power Train for Amphibious Vehicle | Aug. 15, 2006 |
| 7,207,851 | Amphibious Vehicle | Apr. 24, 2007 |
| 7,214,112 | Amphibious Vehicle | May 8, 2007 |
| 7,234,982 | Amphibious Vehicle Suspension | Jun. 26, 2007 |

BRIEF SUMMARY OF THE INVENTION

The present invention provides an amphibious craft having a body with upper and lower sections. The upper section provides a cabin for holding one or more occupants. The lower section is a buoyant raft with an upper surface that is self-bailing. A motor or engine is mounted to the body, preferably contained in a motor mount having a recess that has an outlet drain. A plurality of wheels are attached to the body including a pair of driven wheels. A transaxle interfaces the motor and the driven wheels. A water drive is provided, the transaxle interfaces the motor and the water drive.

The buoyant raft is preferably an unsinkable closed wall, partially or totally foam filled structure that has sufficient buoyancy to support the upper section or cabin above a surrounding water surface. The buoyant raft can provide running boards that are simply an extension of the raft itself, the running boards being positioned outwardly of at least one cabin door and extending to or beyond the wheel base in the preferred embodiment.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
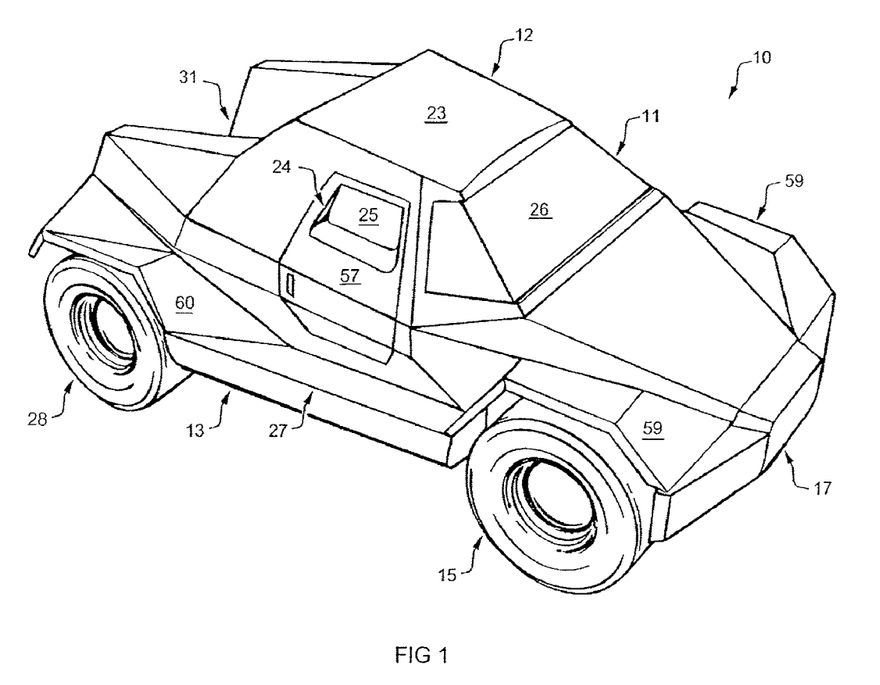
FIG. 1 is a perspective view of the preferred embodiment of the apparatus of the present invention.
Figure 2:
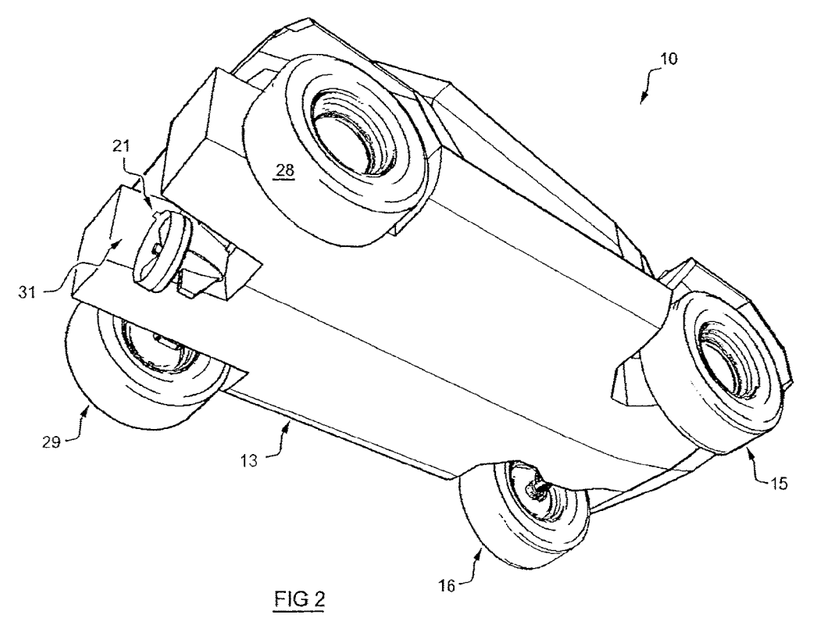
FIG. 2 is a bottom perspective view of the preferred embodiment of the apparatus of the present invention.
Figure 3:
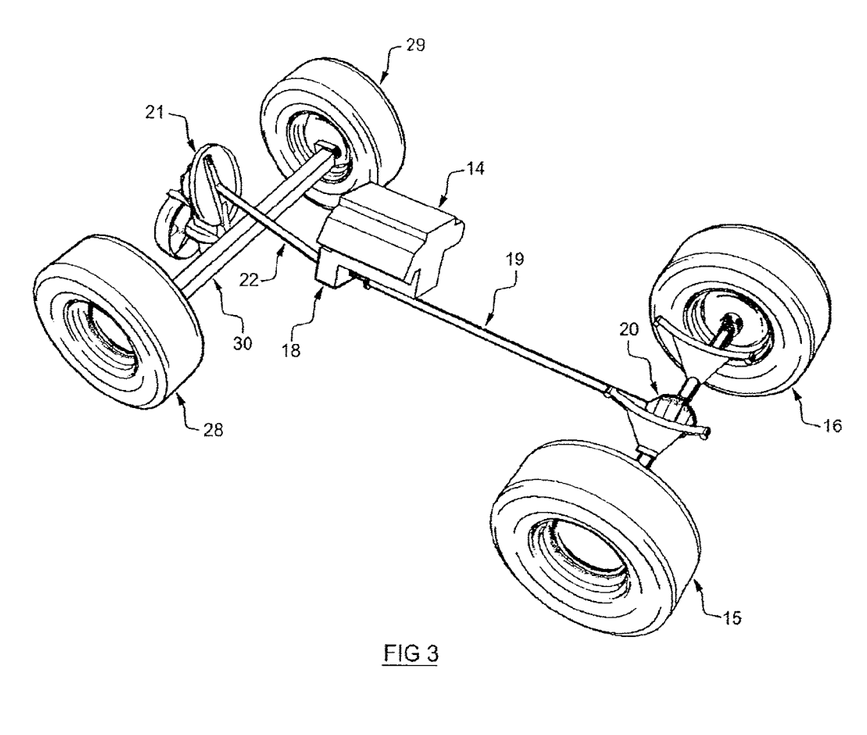
FIG. 3 is a partial perspective view of the preferred embodiment of the apparatus of the present invention.

FIGS. 1-11 show the preferred embodiment of the apparatus of the present invention, designated generally by the numeral 10 in FIGS. 1 and 2. Amphibious vehicle 10 provides a body 11 that can be in two sections. The body 11 has an upper section 12 and a lower section 13. Amphibious vehicle 10 is provided with an engine or motor 14 that drives wheels when the amphibious vehicle 10 is on dry land and a water drive 21 when the amphibious vehicle 10 is floating on a water surface. Water drive 21 is a water drive means for propelling vehicle 11 through water (as when the propellor shown in FIG. 2 turns and forces water therethough).

Engine/motor 14 is placed on and supported by lower section 13, generally centrally, behind a pair of front wheels 15, 16 and in front of a pair of rear wheels 28, 29. Body 11 can provide a bumper 17 that is attached (welded or bolted, for example) to lower section 13, the bumper 17 being a floatation unit that is preferably filled with closed cell foam.

A transaxle or transmission 18 is used to transfer power from engine/motor 14 to wheels 15, 16 or to water drive 21. Engine 14 and transaxle 18 can be a commercially available drive unit. For example, the engine and transaxle can be a General Motors 2.2 L Dual Overhead Cam (DOHC) 16 valve I4 Ecotec engine with a 5 speed automatic transmission and front wheel drive. This engine/transaxle is available as standard equipment in most General Motors and Saturn four (4) cylinder automobiles. Any similar engine/transaxle from another brand can be substituted including diesel or hybrid powered front wheel drive automobiles. Such engine/motor 14 and transaxle 18 assemblies are commercially available from other sources.

Drive shaft 19 extends forwardly from transaxle 18 for connecting with universal joint 20. A disconnect 58 can be provided in between drive shaft 19 and universal joint 20. The disconnect can be for example a Remco (www.remco.com) disconnect. Such a disconnect 58 interrupts the interface between engine/motor 14 and front wheels 15, 16 so that all of the power generated by engine/motor 14 can be used to power water drive 21. Engine/motor can drive water drive 21 with a drive shaft 22 or other suitable drive or linkage. A linkage can be used to steer the water drive 21. Such a linkage (e.g. power steering) is preferably interfaced with the same steering wheel that is used to steer the wheels. Water drive 21 is preferably retractable such as when the apparatus 10 is traveling on land.

Body 11 upper section 12 provides a cabin 23 for housing one or more occupants. The cabin 23 can thus provide a plurality of windows 25, windshield 26, and doors 24. Door 24 can provide a door frame 57 and window 25 (see FIG. 1). Each door 24 preferably opens to a running board 27. In the preferred embodiment, each running board 27 is a part of the lower section 13.

Lower section 13 is preferably in the form of a buoyant raft. The buoyant raft lower section 13 can be of an outer wall or shell 46 that can be fiberglass, welded aluminum, composite or any other structurally sound wall material having an interior 47 that is preferably filled with a solid foam floatation 54 such as a closed cell foam floatation 54. The foam floatation can also be a flexible foam floatation 55. In the preferred embodiment, the flexible foam floatation 55 is positioned next to the front axle as will be discussed more fully hereinafter.

Figure 5:
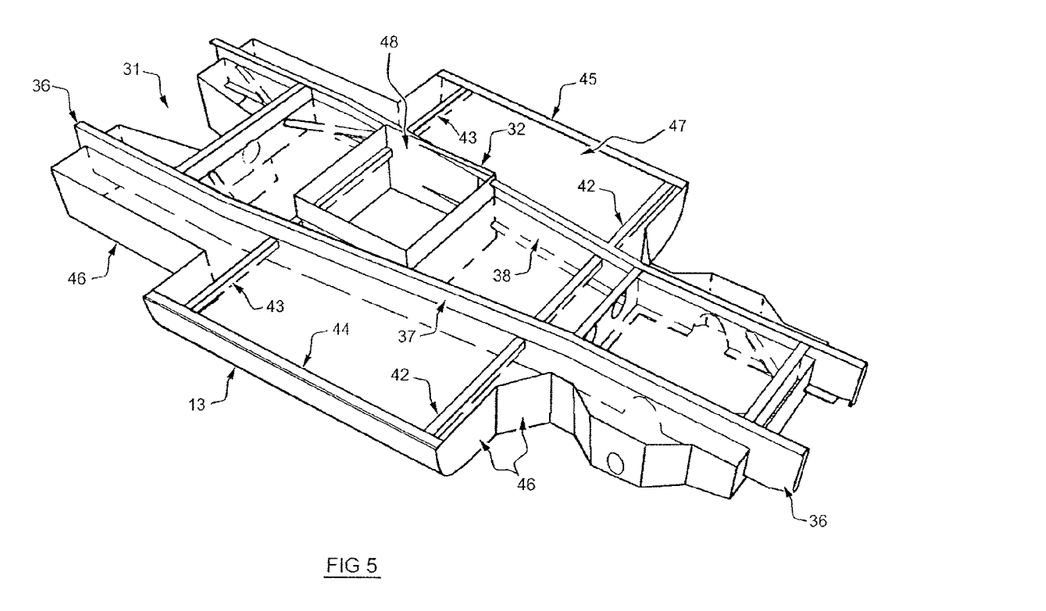
FIG. 5 is a partial perspective view of the preferred embodiment of the apparatus of the present invention.
Figure 6:
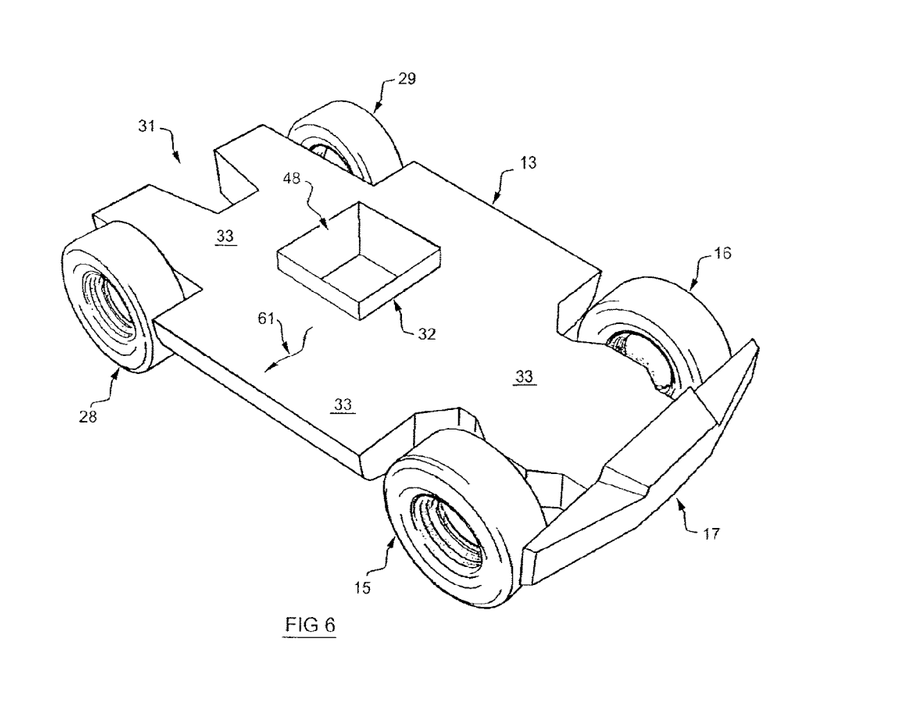
FIG. 6 is a partial perspective view of the preferred embodiment of the apparatus of the present invention.
Figure 7:
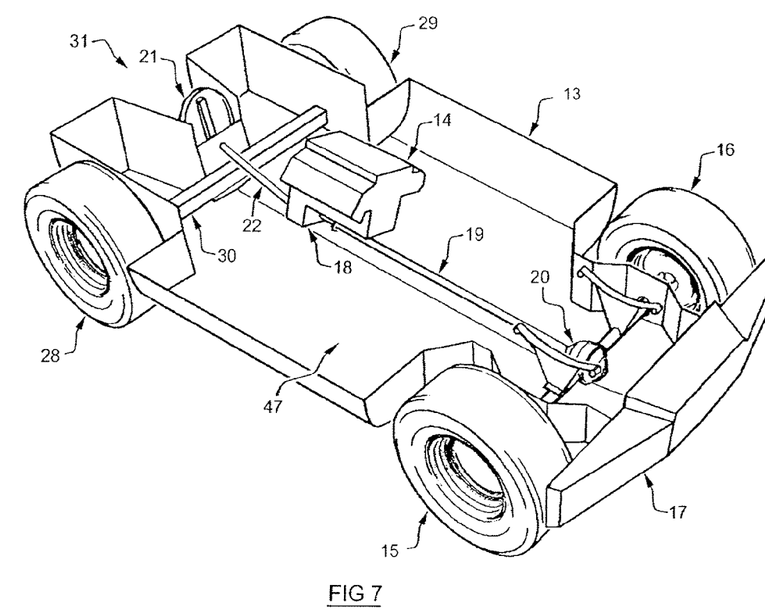
FIG. 7 is a partial perspective view of the preferred embodiment of the apparatus of the present invention.

The lower section 13 can provide a notch 31 for receiving water drive 21 as shown in FIGS. 1, 2, and 5-7. The lower section 13 preferably provides an engine compartment 32 for holding engine/motor 14. Compartment 32 can be a part of body 11 lower section 13 as shown in FIGS. 5 and 6. Engine compartment 32 cavity 48 would be self-bailing, communicating with an opening that is a thru-hull opening that can be fitted with a check valve.

Lower section 13 provides an upper surface 33 that is a self-bailing surface as illustrated schematically by the arrow 61 in FIG. 6. In this fashion, the surface 33 is slightly sloped away from engine compartment 32 and toward running boards 27 so that any fluid that might enter upper section 12 simply flows away from engine compartment 32 and back to the surrounding water surface area. The water line during use, would preferably be some distance below running board 27 and surface 33. Drains/outlets could be provided on upper section 12 or cabin 23 to enable all water to self bail from surface 33. The sloped surface 33 and drains/outlets are means for allowing water to drain from surface 33 automatically.

Figure 8:
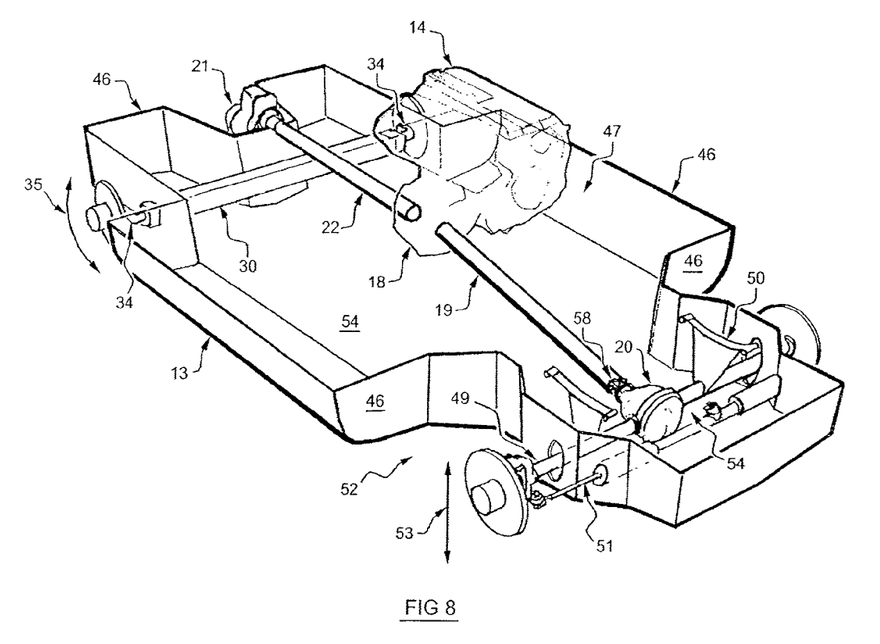
FIG. 8 is a partial perspective view of the preferred embodiment of the apparatus of the present invention with the wheels removed.

A rear axle 30 is provided to which are attached rear wheels 28, 29. Rear axle 30 can be a commercially available rear axle. Such commercially available axles are often used on trailers. Rear axle 30 can provide shock absorbers 34 as shown in FIG. 8. Rear axle/wheel travel is indicated by the arrow 35 in FIG. 8.

Figure 4:
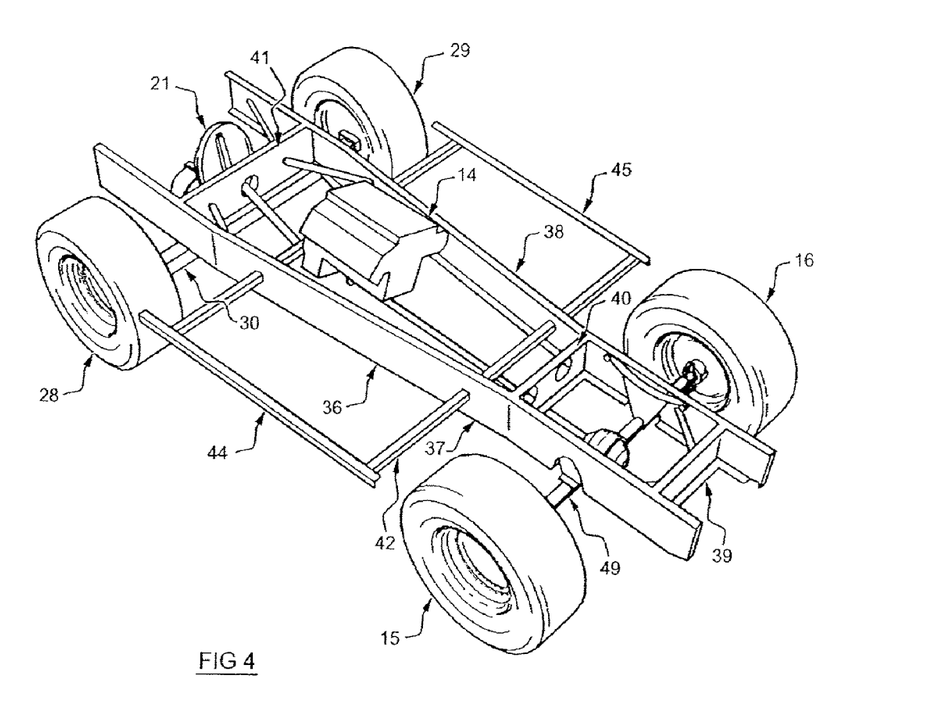
FIG. 4 is a partial perspective view of the preferred embodiment of the apparatus of the present invention.

Lower section 13 can provide a structural frame 36. Frame 36 can include one or more longitudinally extending rails 37, 38 and one or more transverse members 39, 40, 41. In FIGS. 4 and 5, running board beams 42, 43, 44, 45 can be attached (for example, welded) to longitudinal beams 37, 38.

Outer wall/shell 46 provides an interior 47 that is filled with floatation material so that lower section 13 is a buoyant unsinkable raft. The volume of floatation provided by lower section 13 is greater than the displacement of upper and lower sections 12, 13 and any attached components and personnel so that when in the water travel mode, the lower section 13 upper surface 33 is always dry, shedding water and being self-bailing.

Figure 9:
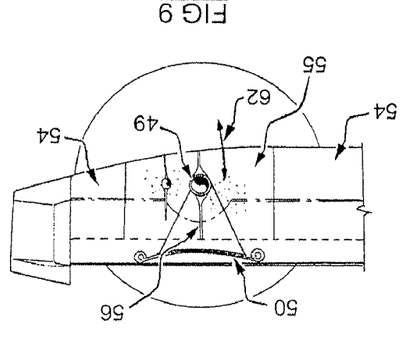
FIGS. 9-10 are fragmentary views of the preferred embodiment of the apparatus of the present invention showing the front axle/raft section.
Figure 10:
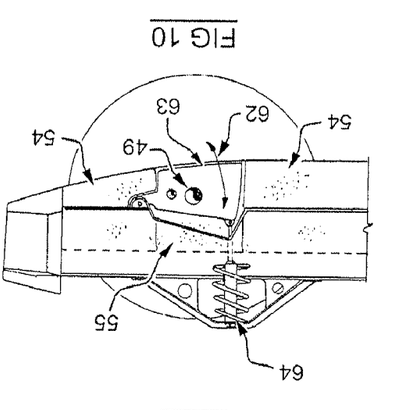

Front axle 49 and its shock system is shown in more detail in FIGS. 8 and 9. Front axle 49 can be supported with leaf springs 50 (FIG. 8, 9) or any other shock absorber 64 (FIG. 10). Springs 50 and shock absorber 64 are a suspension that interfaces wheels 15, 16 with the body 11. A steering rod 51 enables the front wheels 15, 16 to be steered with a steering wheel and steering shaft (e.g. a rack and pinion interface). Wheel turn recesses 52 are provided for enabling the wheels 15, 16 to be turned. In FIG. 9, a flex foam material 55 is provided in front of and behind axle 49 as shown, thus imbedding or encapsulating the suspension in flexible foam 55. However, a void space or cavity 63 could be provided around axle 49 as seen in FIG. 10. In FIG. 9, a split or slot 56 is provided that enables the axle 49 to move up and down as indicated schematically by arrow 62. In FIG. 8, arrow 53 illustrates up and down movement of the front axle 49 and thus the front wheel. Solid foam floatation 54 can be placed in front of and behind the flex foam 55 as indicated in FIG. 9.

It should be understood from an inspection of FIG. 8 that substantially the entire interior 47 of lower section 13 is filled with a foam floatation material. Such a foam is preferably a closed cell foam that is waterproof. Front fenders 59 and rear fenders 60 can be provided.

Figure 11:
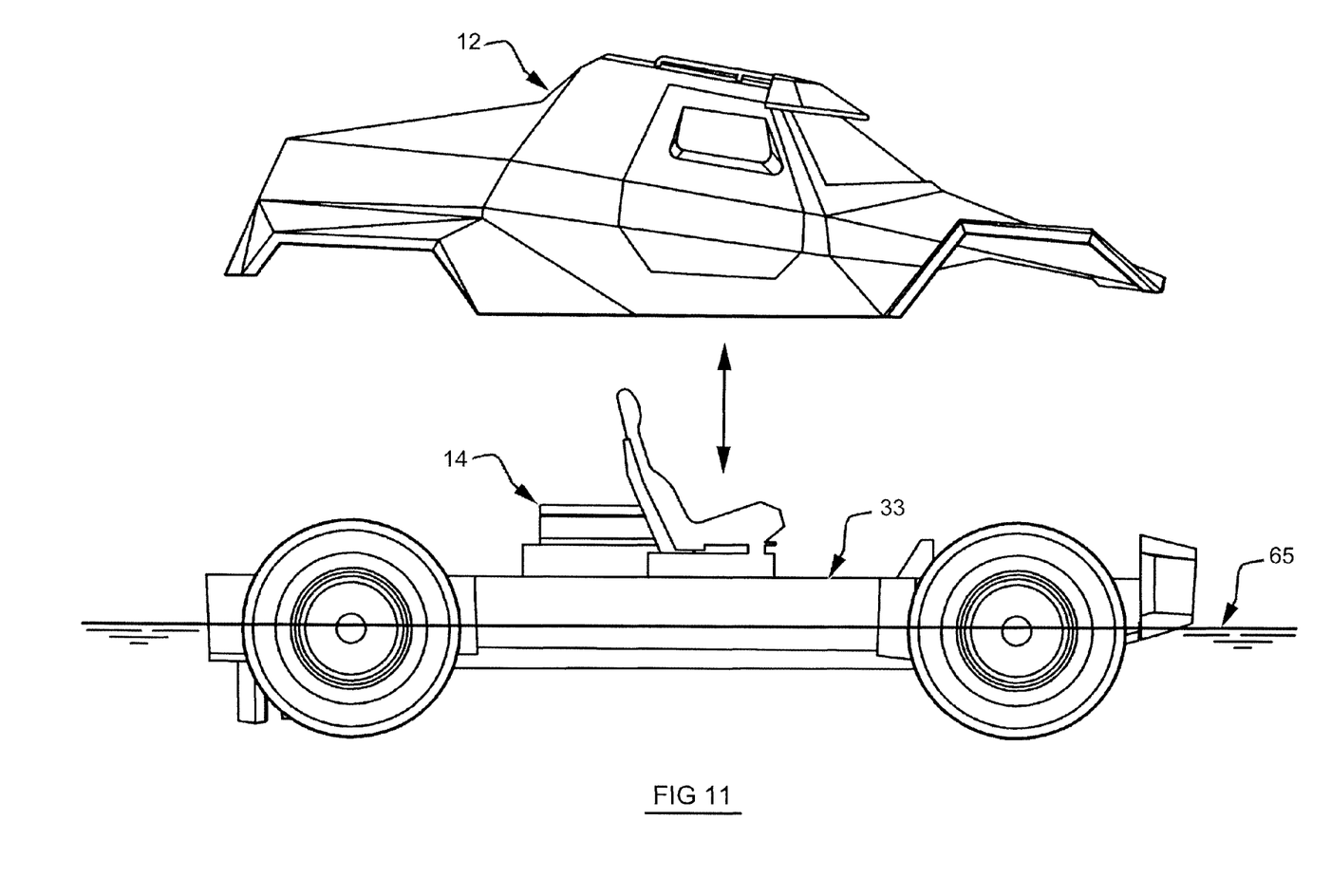
FIG. 11 is a sectional, elevation exploded view of the preferred embodiment of the apparatus of the present invention.

In FIG. 11, craft 10 is shown with upper section 12 elevated above lower section 13. Lower section 13 is shown in operating position when afloat on water surface 65. Lower section 13 is a self-bailing hull meaning that if water were poured or splashed upon any surface of lower section 13, that water would flow downwardly from lower section 13 to water surface 65. The concept of a self bailing hull is known in general, being commercially available from various boat manufacturers such as Boston Whaler, Mako, Grady White, Pursuit and others. Such lower section 13 could be fiberglass foam filled or welded metal such as welded aluminum. Upper section 12 could be of welded metallic construction such as welded aluminum.

The following is a list of parts and materials suitable for use in the present invention.

PARTS LIST

| Part Number | Description |
| --- | --- |
| 10 | amphibious vehicle |
| 11 | body |
| 12 | upper section |
| 13 | lower section |
| 14 | engine/motor |
| 15 | front wheel |
| 16 | front wheel |
| 17 | bumper |
| 18 | transaxle/transmission |
| 19 | drive shaft |
| 20 | universal joint |
| 21 | water drive |
| 22 | drive shaft |
| 23 | cabin |
| 24 | door |
| 25 | window |
| 26 | windshield |
| 27 | running board |
| 28 | rear wheel |
| 29 | rear wheel |
| 30 | rear axle |
| 31 | notch |
| 32 | engine compartment |
| 33 | upper surface |
| 34 | shock absorber |
| 35 | arrow |
| 36 | frame |
| 37 | longitudinal rail |
| 38 | longitudinal rail |
| 39 | transverse member |
| 40 | transverse member |
| 41 | transverse member |
| 42 | running board beam |
| 43 | running board beam |
| 44 | running board beam |
| 45 | running board beam |
| 46 | outer wall/shell |
| 47 | interior |
| 48 | cavity |
| 49 | front axle |
| 50 | leaf spring |
| 51 | steering rod |
| 52 | wheel turn recess |
| 53 | arrow-axle travel |
| 54 | solid foam floatation |
| 55 | flex foam floatation |
| 56 | split/slot |
| 57 | door frame |
| 58 | front drive shaft disconnect |
| 59 | fender |
| 60 | fender |
| 61 | arrow |
| 62 | arrow |
| 63 | void space/cavity |

-continued

| Part Number | Description |
| --- | --- |
| 64 | shock absorber |
| 65 | water surface |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An amphibious craft, comprising:
a) a body having upper and lower sections, the upper section providing a cabin for holding one or more occupants, the lower section being a buoyant raft with an upper surface that is self bailing, having a means for allowing water to drain therefrom automatically;
b) a motor mounted to the body;
c) a plurality of wheels attached to the body, including a pair of driven wheels;
d) a transmission that allows power transfer between the motor and the driven wheels;
e) a water drive means for propelling the craft through water;
f) a transmission that allows power transfer between the motor and the water drive means; and
g) a suspension that connects at least one pair of said wheels with the body, wherein the suspension is imbedded in flexible foam.

2. The amphibious craft of claim 1 wherein the buoyant raft is at least partially foam filled.

3. An amphibious craft, comprising:
a) a body having upper and lower sections, the upper section providing a cabin for holding one or more occupants, the lower section being a buoyant raft with an upper surface that is self bailing, having a means for allowing water to drain therefrom automatically;
b) a motor mounted to the body;
c) a plurality of wheels attached to the body, including a pair of driven wheels;
d) a transmission that allows power transfer between the motor and the driven wheels;
e) a water drive means for propelling the craft through water; and
f) a transmission that allows power transfer between the motor and the water drive means, wherein the buoyant raft is provided with left and right running boards that are extensions of the raft and that contribute buoyancy to the buoyant raft.

4. An amphibious craft, comprising:
a) a body having upper and lower sections, the upper section providing a cabin for holding one or more occupants, the lower section being a buoyant raft with an upper surface that is self bailing, having a means for allowing water to drain therefrom automatically;
b) a motor mounted to the body;
c) a plurality of wheels attached to the body, including a pair of driven wheels;
d) a transmission that allows power transfer between the motor and the driven wheels;
e) a water drive means for propelling the craft through water; and f) a transmission that allows power transfer between the motor and the water drive means, wherein the wheels include a pair of front wheels that are the driven wheels.

5. The amphibious craft of claim 1 wherein the water drive means is a stern drive.

6. The amphibious craft of claim 4 further comprising a suspension that connects each front wheel with the body.

7. The amphibious craft of claim 1 wherein the water drive means is retractable.

8. The amphibious craft of claim 6 wherein the suspension is at least partially encapsulated in flexible foam.

9. The amphibious craft of claim 1 wherein the body lower section is unsinkable having an outer closed wall surrounding an interior that is foam filled.

10. The amphibious craft of claim 1 wherein the body upper section provides a storm protective cabin for occupants.

11. The amphibious craft of claim 10 wherein the body upper section cabin has a transparent windshield that is bullet resistant.

12. The amphibious craft of claim 1 wherein the body lower section has a foam filled floatation bumper.

13. An amphibious craft, comprising:
a) a body having upper and lower sections, the upper section providing a cabin for holding one or more occupants, the lower section being a buoyant raft with an upper surface that is self bailing, having a means for allowing water to drain therefrom automatically;
b) a motor mounted to the body;
c) a plurality of wheels attached to the body, including a pair of driven wheels;
d) a transmission that allows power transfer between the motor and the driven wheels;
e) a water drive means for propelling the craft through water; and
f) a transmission that allows power transfer between the motor and the water drive means, wherein the body lower section has a self draining recess that holds the motor.

14. The amphibious craft of claim 1 wherein the body upper section is a modular cabin that is a self supporting structure that is attachable to the lower body section.

15. The amphibious craft of claim 1 wherein the body upper section is a modular cabin that is a wind resistant shape.

* * * * *